United States Patent
Bertels

(10) Patent No.: US 10,283,256 B2
(45) Date of Patent: May 7, 2019

(54) COMPACT ELECTRICAL DEVICE AND ELECTRODYNAMIC LOUDSPEAKER, ELECTRIC MOTOR, STIRRING DEVICE AND ADJUSTABLE CLUTCH BASED THEREON

(71) Applicant: Eco-Logical Enterprises B.V., Amersfoort (NL)

(72) Inventor: Augustinus Wilhelmus Maria Bertels, Doorwerth (NL)

(73) Assignee: ECO-LOGICAL ENTERPRISES B.V., Amersfoort (NL)

( * ) Notice: Subject to any disclaimer, the term of this patent is extended or adjusted under 35 U.S.C. 154(b) by 545 days.

(21) Appl. No.: 14/903,990

(22) PCT Filed: Jul. 8, 2014

(86) PCT No.: PCT/NL2014/050459
§ 371 (c)(1),
(2) Date: Jan. 8, 2016

(87) PCT Pub. No.: WO2015/005777
PCT Pub. Date: Jan. 15, 2015

(65) Prior Publication Data
US 2016/0163445 A1  Jun. 9, 2016

(30) Foreign Application Priority Data
Jul. 9, 2013  (NL) ...................................... 2011129

(51) Int. Cl.
*H02K 49/02* (2006.01)
*H01F 27/28* (2006.01)
(Continued)

(52) U.S. Cl.
CPC ........... *H01F 27/2804* (2013.01); *H01F 3/08* (2013.01); *H01F 17/06* (2013.01); *H01F 27/08* (2013.01);
(Continued)

(58) Field of Classification Search
CPC ........ H01F 27/2804; H01F 3/08; H01F 17/06; H01F 27/08; H01F 27/255; H04R 2209/024
(Continued)

(56) References Cited

U.S. PATENT DOCUMENTS 316,354 A    4/1885  Gaulard
728,038 A    5/1903  Stowe
(Continued)

FOREIGN PATENT DOCUMENTS

AT    390 600      5/1990
DE    2305776      8/1974
(Continued)

OTHER PUBLICATIONS

International Search Report from PCT/NL2014/050459 dated Jul. 8, 2014.
(Continued)

*Primary Examiner* — Jianchun Qin
(74) *Attorney, Agent, or Firm* — Adsero IP

(57) ABSTRACT

An electrical device comprises a stack of electric elements, each comprising: an electrically insulating substrate, for instance of plastic, and at least one electrically conductive track connected to said substrate; the end zones of each of which tracks have terminals either for connection to a source of electrical energy, whereby electric current is conducted through each track during operation, or connection to a device for taking off electric current generated by magnetic
(Continued)

induction in the track; which electric elements are connected mechanically to each other such that the device is unitary.

10 Claims, 14 Drawing Sheets

(51) Int. Cl.

| | | |
|---|---|---|
| H01F 3/08 | (2006.01) | |
| H01F 17/06 | (2006.01) | |
| H01F 27/08 | (2006.01) | |
| H01F 27/255 | (2006.01) | |
| H04R 9/02 | (2006.01) | |
| H01F 27/29 | (2006.01) | |
| H02K 1/02 | (2006.01) | |
| H02K 3/26 | (2006.01) | |
| H02K 7/11 | (2006.01) | |
| H04R 7/20 | (2006.01) | |
| H04R 9/06 | (2006.01) | |
| H05B 6/36 | (2006.01) | |
| H05B 6/42 | (2006.01) | |

(52) U.S. Cl.
CPC ....... *H01F 27/255* (2013.01); *H01F 27/2823* (2013.01); *H01F 27/29* (2013.01); *H02K 1/02* (2013.01); *H02K 3/26* (2013.01); *H02K 7/11* (2013.01); *H04R 7/20* (2013.01); *H04R 9/022* (2013.01); *H04R 9/025* (2013.01); *H04R 9/06* (2013.01); *H05B 6/36* (2013.01); *H05B 6/42* (2013.01); *H04R 2209/024* (2013.01)

(58) Field of Classification Search
USPC ...................................................... 310/105
See application file for complete search history.

(56) References Cited

U.S. PATENT DOCUMENTS

| | | | |
|---|---|---|---|
| 2,911,605 A | 11/1959 | Wales, Jr. | |
| 3,089,105 A | 5/1963 | Saaty | |
| 3,089,106 A | 5/1963 | Saaty | |
| 3,708,251 A | 1/1973 | Pierro | |
| 4,064,403 A | 12/1977 | Miller | |
| 4,132,414 A | 1/1979 | Dinsdale | |
| 4,459,087 A | 7/1984 | Barge | |
| 4,517,540 A * | 5/1985 | McDougal | F16L 37/084 336/107 |
| 4,720,640 A | 1/1988 | Anderson | |
| 4,807,830 A | 2/1989 | Horton | |
| 5,038,104 A | 8/1991 | Wikswo, Jr. | |
| 5,289,088 A | 2/1994 | Andoh | |
| 5,432,658 A * | 7/1995 | Kajita | G11B 5/588 360/291.7 |
| 5,474,429 A | 12/1995 | Heidelberg | |
| 5,535,582 A | 7/1996 | Paweletz | |
| 5,886,610 A * | 3/1999 | Canova | H01F 27/2847 336/183 |
| 8,446,243 B2 * | 5/2013 | Strzalkowski | H01F 17/0013 257/531 |
| 8,752,787 B2 | 6/2014 | Ruan | |
| 8,933,598 B2 | 1/2015 | Dunne | |
| 2003/0193198 A1 | 10/2003 | Wooben | |
| 2004/0069901 A1 | 4/2004 | Nunnally | |
| 2006/0278963 A1 | 12/2006 | Harada | |
| 2008/0042504 A1 | 2/2008 | Thibodeau | |
| 2008/0193305 A1 | 8/2008 | Tateishi | |
| 2008/0292467 A1 | 11/2008 | Borgen | |
| 2010/0201129 A1 | 8/2010 | Holstein | |
| 2010/0290890 A1 | 11/2010 | Bertels | |
| 2011/0031760 A1 | 2/2011 | Lugg | |
| 2011/0074397 A1 | 3/2011 | Bulumulla | |
| 2012/0068693 A1 | 3/2012 | Ocket | |
| 2012/0094555 A1 | 4/2012 | Calverley | |
| 2012/0201703 A1 | 8/2012 | Tanaka | |
| 2012/0211990 A1 | 8/2012 | Davey | |
| 2012/0299685 A1 | 11/2012 | Yokota | |
| 2013/0323096 A1 | 12/2013 | Mueller | |
| 2014/0255207 A1 | 9/2014 | Boyer | |
| 2016/0152327 A1 | 6/2016 | Bertels | |
| 2017/0213635 A1 | 7/2017 | Bertels | |

FOREIGN PATENT DOCUMENTS

| | | | |
|---|---|---|---|
| DE | 2744125 | 4/1979 | |
| DE | 3203958 | 8/1982 | |
| DE | 10 2004 063205 | 5/2006 | |
| EP | 0 035 964 | 9/1981 | |
| EP | 0035964 A1 * | 9/1981 | ......... H01F 27/2804 |
| EP | 0 435 461 | 7/1991 | |
| EP | 0 601 791 | 6/1994 | |
| EP | 0 953 993 | 11/1999 | |
| EP | 1 260 998 | 11/2002 | |
| EP | 1 353 436 | 10/2003 | |
| EP | 1878911 | 1/2008 | |
| EP | 2 551 190 | 1/2013 | |
| GB | 2 370 922 | 7/2002 | |
| JP | S56140562 | 11/1981 | |
| JP | S59 101068 | 6/1984 | |
| JP | H06 325948 | 11/1994 | |
| WO | WO 96/19670 | 6/1996 | |

OTHER PUBLICATIONS

International Search Report from PCT/NL2015/050551 dated Jan. 4, 2016.
Notice of Allowance for U.S. Appl. No. 15/329,473 dated Apr. 6, 2018.
International Search Report from PCT/NL2014/050497 dated Apr. 2, 2015.
Notice of Allowance for U.S. Appl. No. 14/907,057 dated Jul. 14, 2016.
International Search Report from PCT/NL2014/050458 dated Oct. 15, 2014.
Norris (2005) Flight International "Levitating Fan Rotor Paves Way to Electric Flight"168 (4994): 22.
Office Action for U.S. Appl. No. 14/904,009 dated May 2, 2018.

* cited by examiner

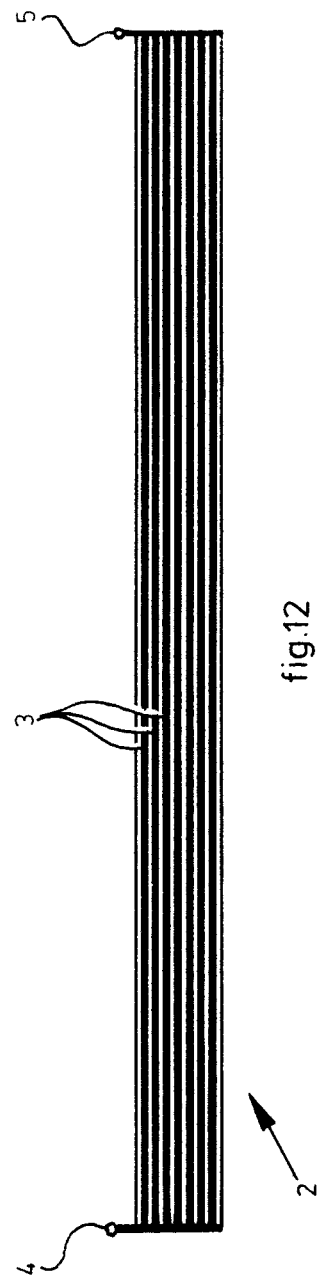
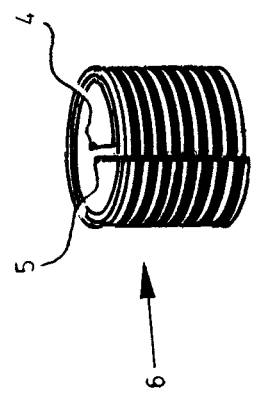
fig.12
fig.13

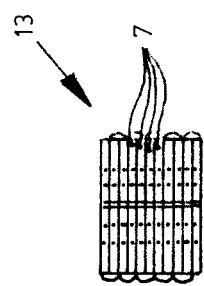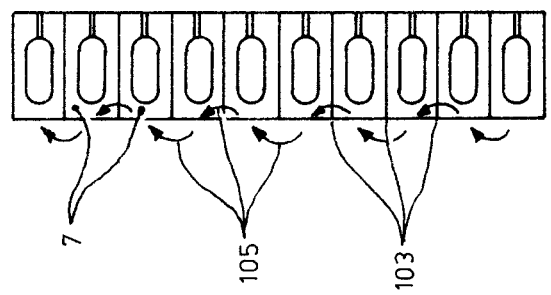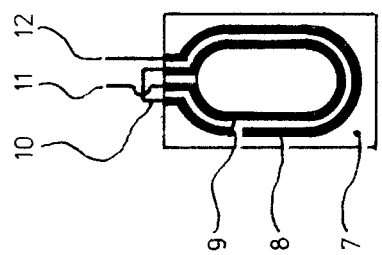
fig.16
fig.15
fig.14

COMPACT ELECTRICAL DEVICE AND ELECTRODYNAMIC LOUDSPEAKER, ELECTRIC MOTOR, STIRRING DEVICE AND ADJUSTABLE CLUTCH BASED THEREON

CROSS-REFERENCE TO RELATED APPLICATIONS

This application is a 35 U.S.C. § 371 national phase application of PCT/NL2014/050459 (WO 2015/005777), filed on Jul. 8, 2014, entitled "Compact Electrical Device and Electrodynamic Loudspeaker, Electric Motor, Stirring Device and Adjustable Clutch Based Thereon", which application claims priority to Netherlands Application No. 2011129, filed Jul. 9, 2013, which is incorporated herein by reference in its entirety.

BACKGROUND

(1) Technical Field

The invention relates to an electrical device, for instance a solenoid, a coreless coil, a self-inductor or coil with ferromagnetic core, a transformer, an anchor element of an electric motor, an electric heating element, for instance for a hairdryer, or the like.

In order to manufacture a coil it is usual for conductive wire, in particular copper wire with an insulating sheath, to be wound onto a coil base. Depending on the technical design, the coil can comprise one layer but also be constructed from a number of layers. Because the adjacent layers are wound in opposite directions, it is in principle impossible to realize the densest stacking of the wires which could be obtained if all layers were wound in the same direction. Because the usual copper wires all have a round cross-section, the stacking leaves a great deal to be desired and there is much wasted space.

Coils are further often wound in relatively careless and disordered manner. This is particularly the case with structures which are difficult to access, such as a multi-pole anchor of an electric motor, a toroidal transformer and the like, wherein it is not possible to lay the windings tightly adjacent to each other with a rapidly rotating winding machine. In this case there is in practice an even greater proportion of unused space.

SUMMARY

With an eye to the above, the invention provides an electrical device comprising a stack of electric elements, each comprising:

an electrically insulating substrate, for instance of plastic, and at least one electrically conductive track connected to said substrate;

the end zones of each of which tracks have terminals either for connection to a source of electrical energy, whereby electric current is conducted through each track during operation, or connection to a device for taking off electric current generated by magnetic induction in the track;

which electric elements are connected mechanically to each other such that the device is unitary.

The device preferably has the special feature that the substrates have a thickness of a maximum of 0.2 mm, preferably a maximum of 0.1 mm. With such a small thickness the device can be given a very compact form, wherein the compactness can be better than in the case of even the densest stacking of round copper wires, which is in any case not realizable in practice. It will be apparent that the substrates have to have a certain minimum thickness in order to ensure, in combination with the material properties, that the breakdown voltage is always higher than the electric voltage which can occur between the electrically conductive tracks on the substrates.

The device is preferably embodied such that the tracks are flat.

The tracks can optionally, also depending on the thickness of the substrates, be embodied as wires.

Greatly recommended is the embodiment in which the tracks are placed embedded or recessed into the substrates. With such an embodiment the substrates are flat, or at least non-profiled, on both sides and the substrates with the tracks present thereon can be laid tightly onto each other.

The substrates can consist of any desired material. High-quality paper types could for instance be envisaged. Recommended however is an embodiment in which the substrates consist of a thermoplastic.

Such a device preferably has the special feature that the thermoplastic is polyetherimide. Polyetherimide is an ultra-high-quality thermoplastic suitable for injection moulding and extrusion. When combusted no harmful gases are released, only $H_2O$ and $CO_2$. All relevant properties of polyetherimide are substantially independent of temperature up to about 200° C. Polyetherimide thus also has the advantage of being suitable for indoor use, where materials which release harmful gases in the case of combustion must be avoided.

The use of polyetherimide has the further advantage that, following assembly of a device, the outer surfaces can be made smooth by calendering, i.e. a heat treatment with a smooth surface under a certain pressure.

In another embodiment the device has the special feature that the substrates consist of a thermosetting plastic.

Such a device can be embodied such that the thermosetting plastic is polyimide. Polyimide is a plastic which is per se very well usable technically but has the drawback that when combusted it releases gases and vapours which are harmful to health.

In a practical embodiment the device can be embodied such that the electrical elements are adhered to each other by welding the substrates of mutually adjacent electrical elements to each other by fusion through temperature increase to the softening temperature of the plastic, for instance by ultrasonic welding. Such a treatment can be performed in the case of both thermoplastics and thermosetting plastics. The curing of thermosetting materials can take place as a result of the stated temperature increase.

In another embodiment the device can have the special feature that the electrical elements are adhered to each other by evaporating solvent in which the plastic is present prior to the manufacture of the device by increasing temperature.

According to yet another aspect of the invention, the device has the special feature that, of adjacent elements, the one element protrudes on the one side from the stack and the other element protrudes on the other side from the stack. Such an embodiment can have the advantage that the protruding parts of the elements can effectively contribute toward cooling. This is particularly the case in an embodiment in which the electrically conductive tracks are enlarged such that they also form part of the parts protruding from the stack.

In an important embodiment the device has the feature that the elements are substantially the same as each other.

In general and in respect of the foregoing aspect in particular, the device can advantageously have the special feature that the elements are disposed in register in the stack. The use of identical elements has an advantage in respect of production engineering. Only one type of element need be manufactured in numbers per product. Arrangement in register has in combination herewith a technical advantage in respect of the desired placing in a stack.

Depending on the dimensioning and the desired electrical and magnetic properties, the device can have the special feature that the tracks are connected at least groupwise in parallel.

As alternative hereto or in combination herewith the device can have the special feature that the tracks are connected at least groupwise in series.

An optimization which can be carried out subject to the determined technical conditions has the special feature that the terminals of the tracks or groups of tracks can be connected selectively in parallel or in series by an external switching device. With such an embodiment the relation between current, voltage and impedance can be chosen freely within certain limits.

According to a specific aspect of the invention, the device has the special feature that the device is a heating device and the tracks consist at least along a part of their length of a resistance material, such as an amorphous metal mixture, a semi-conducting graphene, constantan or inconel, and the substrates consist of a material which is mechanically and chemically resistant to the temperatures prevailing in the tracks during operation.

Such a heating device can particularly be embodied such that the stack has at least one continuous channel extending through the tracks of resistance material, through which channel optionally extends an elongate heat-conducting element which has at least an electrically insulating outer surface and fits tightly into the channel and is thus in thermal contact with the tracks of resistance material for the purpose of discharging the heat generated therein. Such a device can be constructed with a very high degree of compactness.

Heat-conducting materials are usually also good electrical conductors. In order to ensure that the elongate heat-conducting element does not disrupt the electrical operation of the heating device, the device can be embodied such that the elongate heat-conducting element has an electrically insulating cover layer. It should be understood that an electrically insulating cover layer, for instance a very thin layer of polyetherimide, causes only a negligible thermal resistance due to its very small thickness, for instance several micrometers.

A superior heat transfer is obtained with an embodiment in which the elongate heat-conducting element is hollow, filled with a two-phase medium and operative as heat pipe or a part thereof.

According to another aspect of the invention, the device is embodied such that the device comprises a coil assembled from windings having electrically the same orientation, and the tracks comprise electrically conductive material, such as a conductive graphene, silver, gold, copper, aluminium, mercury accommodated in channels, or a plasma, and each winding extends in loop-form between two end zones. The conductive graphene can have the thickness of for instance one atom layer. Due to the nature of the crystalline carbon structure, its electrical resistance can nevertheless be considerably lower than that of copper, a superior heat conductor.

"Copper" must also be understood to mean beryllium copper. The heat conduction and the electrical conduction of beryllium copper are comparable to those of copper, but the material has a very high tensile strength. Beryllium copper is hereby extremely suitable for manufacturing for instance the cage of a high-speed rotor of an electric motor.

It should be generally understood that a coil according to the invention can have a very great compactness. A linear dimension of for instance only 0.1 mm or less is required per winding. Over a distance of for instance 10 cm the number of windings according to the invention is then already 1000 or more. The winding density according to the invention can amount to 50-100 times that of a known transformer or choke. A coil, transformer or other device according to the invention can alternatively be miniaturized while retaining the important properties. Such a miniaturization is for instance important for medical applications such as implants, such as heart stimulators, brain sensors and the like. A hearing aid can also be manufactured making use of the principles according to the invention which is placed as implant in the inner ear and configured to directly excite the auditory nerve paths while bypassing the middle ear, which may be damaged in the case of some patients. Energy transfer can also take place wirelessly on the basis of the principles of the invention.

The invention can thus provide devices on microscale, while even manufacture of devices on nanoscale is possible. The manner in which such micro-miniaturization can be realized according to the invention will be discussed hereinbelow.

In yet another embodiment the device has the special feature that each element has a through-hole present inside the or each loop, these registered and uniform through-holes forming a channel in which a fixed or longitudinally movable ferromagnetic core is present which co-acts with the windings. In the case of a longitudinally movable ferromagnetic core the device can operate as actuator. In the case of a fixed core the device can be embodied as choke, transformer or antenna.

The device can have the special feature that at least some of the electrical elements comprise a winding which together form a first coil, and at least some of the electrical elements comprise a winding, which together form a second coil such that the device can serve as transformer.

The device is preferably embodied such that the channel is prismatic, i.e. has the same cross-sectional form at any axial position, and the core fits therein with small clearance.

Because the power handling capacity of a coil or transformer is determined in most cases by the maximum allowable temperature inside the electrically conductive section, so the coils, the device according to the invention can advantageously have the special feature that the stack of elements has at least one continuous channel extending through the tracks, through which channel optionally extends an elongate heat-conducting element which has at least an electrically insulating outer surface and fits tightly into the channel and is thus in thermal contact with the tracks of electrically conductive material for the purpose of discharging heat generated therein. The or each coil is hereby cooled with a high degree of effectiveness.

Similarly to the embodiment already discussed above, the device can have the special feature that the elongate heat-conducting element has at least an electrically insulating outer surface.

The device can likewise have the special feature that the elongate heat-conducting element is hollow, filled with a two-phase medium and operative as heat pipe or a part thereof.

In the case where a core is present and this core is subject to a substantial heating, the device can advantageously have the special feature that the core has at least one continuous channel through which optionally extends an elongate heat-conducting element which fits tightly into the channel and is thus in thermal contact with the material of the core for the purpose of discharging the heat generated therein.

Referring once again to the above discussion in respect of the heat discharge, in this latter embodiment the device can have the special feature that the elongate heat-conducting element has an electrically insulating outer surface.

The device can also have in this latter embodiment the feature that the elongate heat-conducting element is hollow, filled with a two-phase medium and operative as heat pipe or a part thereof.

An improved magnetic effectiveness is obtained with an embodiment in which the core forms part of a closed ferromagnetic circuit, wherein the end zones of the core outside the area of the coil are connected to each other by a ferromagnetic bridge.

This embodiment can be manufactured easily when it has the special feature that the prismatic core with the bridge is embodied divided into at least two parts, and during assembly of the device the whole core or at least the first part of the core with the part of the bridge connected thereto or forming a whole therewith is first inserted into the channel and the remaining part of the bridge with optionally the second part of the core is then connected tightly thereto.

A particular embodiment of this latter variant has the feature that a bridge which is rotation-symmetrical relative to the central axis of the core connects to the end zones of the core, and the device has a generally spherical form. With such an embodiment, which can fulfil the function of self-inductor or transformer, there is no external magnetic field.

Optimal use is made of the ferromagnetic material of the core and the bridge with an embodiment according to the above described variant in which the total effective cross-sectional area of the bridge through which the magnetic flux flows is substantially equal at each angular position ±90° relative to the equator to the cross-sectional area of the core such that the magnetic flux density is substantially the same in each said cross-sectional area.

According to a very important aspect of the invention, the device described in the foregoing is embodied such that the core and optionally the bridge comprises grains of ferromagnetic material, for instance niobium, iron, ferrite or an amorphous metal mixture, embedded in a plastic, for instance polyetherimide or polyimide. Other than in usual devices of this type with lamination stacks, no eddy currents occur here in the core and the bridge due to the use of grains of ferromagnetic material. The heat dissipation in the core and the bridge is hereby substantially lower than according to the prior art. The core and optionally the bridge can further be manufactured with a very high measure of design freedom and be constructed more compactly.

Of great importance is a further elaboration of the previous aspect, wherein the grains are substantially spherical and a number of classes of grains of different grain size are premixed in accordance with a Gaussian distribution during production in a manner such that the interstitial spaces between relatively large grains are filled for a major part with relatively small grains such that the available space is occupied to a minimum of 90%, preferably 95%, by grains of ferromagnetic material. An ideal densest spherical stacking with negligible interstitial spaces can be approximated very closely using for instance three or four classes of grain size. What must be envisaged here is an approximation in the order of 95% or better. In addition, making use of the above described shaping principles according to the invention there are no stray fields or dead zones in the core and the bridge. Tests have established that the power density which can be realized according to the invention on this latter basis lies in the order of 95% of the theoretical maximum. No more than about 25% is feasible in the case of transformers with lamination stacks and a usual winding technique according to the prior art.

Attention is drawn to the fact that diverse ferromagnetic materials are available commercially in the form of powders consisting of small mini-spheres and having the described grain size distribution. According to the invention three or four classes can for instance be mixed together and incorporated in the plastic. A ferromagnetic "dough" is in this way made which is shaped into cores and bridges or yokes by being pressed in a mould. The plastic, for instance polyimide or polyetherimide, is then allowed to cure through evaporation of the solvent at a temperature of for instance about 250° C. Use can also be made of microwaves at a suitable frequency, so on the basis of magnetron technology or a dielectric or RF heating.

It should be understood that the ferromagnetic properties of the cores and bridges or yokes according to the invention approach those of the homogenous material, be it that no eddy currents can occur. This is because the applied plastics are insulators and the mini-spheres of ferromagnetic material are effectively separated from each other electrically by the plastic.

The largest grains of ferromagnetic material can for instance have a central grain size in the order of 50 μm, while in the case of the powders and aggregates with other grain sizes these central grain sizes can for instance lie in the order of 20, 10 and 5 μm.

According to yet another aspect of the invention, the device can be embodied such that tensively strong fibres, for instance of steel, are embedded in the plastic in order to increase the tensile strength and the mechanical integrity of the core and optionally the bridge during operation.

In yet another embodiment the invention has the special feature that the fibres are ribbon-like.

This latter embodiment can be embodied such that the ribbon-like fibres have a plastically twisted form.

A high tensile strength in two independent directions is obtained with an embodiment in which the fibres are assembled into one or more meshworks. In such an embodiment the tensile strength is substantially equal in all directions inside the plane defined by the meshwork and is very great.

The invention further relates to an electrodynamic loudspeaker, comprising:
 a frame;
 a cone suspended elastically relative to said frame;
 a voice coil unit which is coupled to the cone and embodied as a device according to claim 22 and which comprises a cylindrical voice coil substrate and an electrically conductive coil present thereon through which alternating current can be conducted via terminals;
 a magnet unit, comprising
  an annular permanent magnet, for instance of neodymium, alnico, ticonal, a ceramic material or an amorphous metal mixture, and
  a ferromagnetic yoke which defines a cylindrical gap in which a magnetic field prevails under the influence of the permanent magnet and in which the voice coil unit is movable in axial direction under the influence of the electric currents carried by the coil, which yoke comprises grains of ferromagnetic material, for instance niobium, iron, ferrite or an amorphous metal mixture, embedded in a plastic, for instance polyetherimide or polyimide.

Such a loudspeaker constructed according to the teaching of the invention has diverse advantages. The motor system can have a substantially more compact and therefore smaller construction, as set forth above. The magnet system can be designed and embodied in superior manner on the basis of the invention and the voice coil system can be constructed with a high degree of compactness, while the heat discharge can nevertheless be very good, whereby the voice coil has a higher power handling capacity than with a comparable prior art loudspeaker. The loudspeaker according to the invention has for this purpose the special feature that the stack of elements has at least one continuous channel extending through the tracks, through which channel a reciprocating airflow moves during operation of the loudspeaker and has a cooling effect on the stack of elements.

Still further improved cooling, and thereby a further increased power handling capacity, is realized with a loudspeaker of the type discussed in the preceding paragraph in which the ferromagnetic yoke has at least one continuous channel for passage of a reciprocating airflow during operation of the loudspeaker.

The invention further relates to an electric motor. Electric motors are commercially available in many types of embodiment, dimensions and power. It is an object of the invention to design an electric motor such that it combines a high power handling capacity with a very compact construction. The invention provides in this respect an electric motor comprising:

a stator with an annular collar of electromagnets, comprising a coil according to the invention with a fixed ferromagnetic core present therein;

an electronic power supply and control unit for conducting electric currents through the electromagnets such that they together effectively generate a rotating magnetic field; and a rotor with at least one ferromagnetic element which co-acts magnetically with the magnetic fields generated by the electromagnets;

such that the rotor is driven rotatingly by the rotating magnetic field.

A usual electric motor comprises for instance a rotor with eight anchors with a core around which coils are arranged. Owing to the construction of such a rotor the coils are difficult to manufacture. As a result such coils are often manufactured carelessly and with much unused space. According to the invention the space taken up in a coil is almost 100%, while there is a greater measure of freedom to design the core with ferromagnetic grains embedded in plastic.

In a specific embodiment the electric motor can have the special feature that under the control of the power supply and control unit the starting torque of the rotor is temporarily increased during starting thereof by temporarily connecting in parallel the coils of two or more adjacent devices.

The electric motor can be embodied and applied in different ways. According to an aspect of the invention, the electric motor has the special feature that the application of the electric motor forms part of the group to which belong: an electric motor, a rotary actuator, a motor, a clutch between two axially aligned rotatable shafts, an adjustable transmission, a stirring device.

The invention also relates to a stirring device in which use is made of coils, ferromagnetic cores and ferromagnetic elements according to the invention. Such a stirring device has the special feature that the rotor comprises at least one elongate ferromagnetic element extending in diagonal direction relative to the collar during operation.

A superior stirring device has the special feature that the rotor comprises a ring consisting of a plastically twisted ribbon;

the ribbon is ferromagnetic;

the diameter of the ring and the diameter of the electromagnets have roughly equal values; and the wavelength of the twisted ribbon of the ring is at least twice, preferably at least three times greater than the pitch distance of the electromagnets according to claim 23;

wherein the electronic unit conducts currents through the devices during operation such that all lowest zones located closest to the electromagnets all co-act magnetically with the electromagnets.

Such a stirring device has superior stirring properties. These are caused mainly by the fact that the twisted ribbon cuts effectively through stationary water masses without this resulting in a strong central vortex or eddy. The stirring speed can be easily regulated under the control of a control unit which determines the frequency of the rotating magnetic field.

Particularly in the case aggressive media or substances are being stirred, the stirring device can advantageously have the special feature that at least the surface of the rotor is chemically and mechanically resistant to the influence of the substance for stirring. Simple and inexpensive is an embodiment in which the rotor consists of a ferromagnetic stainless steel.

The stirring device can alternatively have the special feature that the rotor comprises a cover layer which wholly covers the ferromagnetic element or the ribbon and which consists of a material which is chemically and mechanically resistant to the influence of the substance for stirring, the material being for instance glass, an enamel or a plastic such as polytetrafluoroethylene (PTFE).

The invention also relates to an adjustable clutch between two shafts which are disposed axially aligned for rotation relative to a frame, the clutch comprising:

a first clutch disc carried by the one shaft with:
an annular collar of electromagnets according to the invention carried on the free end surface thereof; and
the secondary section of a rotary transformer, the primary section of which is disposed fixedly relative to the frame, which secondary section is connected to the electromagnets for actuation thereof; and a second clutch disc which is carried by the other shaft and the free end surface of which carries a number of ferromagnetic elements corresponding to the number of electromagnets of the first clutch disc for magnetic co-action with said electromagnets when these are actuated via the rotary transformer by an adjustable, at least on and off switchable, external source of alternating current.

Such an adjustable clutch has no wearing surfaces because the mutually co-acting magnets do not after all need to have any physical contact with each other, but need to be placed only a short distance from each other. The changeover speed between the operating states of the clutch is many orders of magnitude greater than that of a mechanical clutch. It must thus be stated that an electromagnetic clutch according to the invention has superior properties.

Of importance is an embodiment in which the clutch has the special feature that the cores of the electromagnets are embodied as permanent magnets;

the coils of the electromagnets are connected via rectifier means to the secondary section of the rotary transformer; such that:

when the electromagnets are not actuated, these electromagnets co-act with the ferromagnetic elements and the shafts are forced to rotate together; and when the electromagnets are actuated by the external source of alternating current the magnetization of the cores is reduced to a value of at least approximately zero and the magnetic co-action between the electromagnets and the ferromagnetic elements is disabled and the shafts can rotate independently of each other.

The operation of the clutch in this embodiment corresponds to that of the mechanical clutch in for instance a motor vehicle. The operator operates the clutch during the short time in which it is necessary to shift from the one transmission ratio of the transmission of for instance a motor vehicle to the other, and during stationary use the clutch is at rest without any form of external engagement. This is also the case in this latter embodiment of the clutch according to the invention.

In a subsequent aspect of the invention the adjustable clutch has the special feature that the number of active electromagnets can be adjusted under the control of the electronic unit in a manner such that the active electromagnets are distributed individually or in groups angularly equidistant over the collar such that the clutch also operates as transmission with adjustable transmission ratio. Such a clutch does not require any frequency controls, gearboxes, V-belts and suchlike costly components which are often subject to wear and malfunction. By choosing for instance the number of 48 poles the number of active electromagnets can be reduced selectively and successively by for instance, 2, 3, 4, 6, 8, 12, 24, 36. Other values are obviously possible. A substantially continuously adjustable clutch is in this way obtained by electronic control.

It should be understood that such a clutch cannot be readily implemented with the prior art. Of essential importance is the high degree of compactness, an excellent use of the available space and a low heat production in combination with an excellent heat discharge, these aspects in combination guaranteeing an excellent energy management.

The invention further relates to a combination of an electric motor according to the above stated specification and an adjustable clutch according to the above specification, wherein the electric motor is embodied such that its rotor rotates during operation at a relatively high rotation speed and the adjustable clutch reduces this rotation speed substantially, by a factor of at least 3, to a relatively low rotation speed.

Such a combination is for instance of great importance for the further development of electric and hybrid cars. Power supply to the electric motor and power supply to the adjustable clutch can take place by making use of a converter which converts the direct voltage from the accumulator to suitable alternating voltages.

Attention is further drawn to the fact that, particularly in the case of rotary applications, the rotor of for instance an electric motor can carry electrically operating elements, for instance heating means. This can be powered according to the invention by a rotary transformer constructed on the basis of the techniques according to the invention as described in the foregoing.

Mentioned is also made in the foregoing that it is very important that heat generated in the device according to the invention is discharged. The magnet system of a loudspeaker or the stator of an electric motor can for instance thus be provided with external cooling fins which make an additional contribution to the effective cooling of the associated components.

Many applications of the invention can be envisaged:

a coil with a movable core, among other purposes as actuator;

a coil with a core for a self-inductor or a transformer;

an electromagnet;

an electric motor with an internal or external rotor;

a generator which generates electricity on the basis of moving medium such as wind or water;

a relay;

an electric signalling device, for instance a bell or buzzer;

an electrodynamic loudspeaker or headphone;

MRI equipment;

a spectrometer;

particle accelerators;

a magnetic lock;

waste separation, in particular the removal of ferromagnetic waste;

a lifting magnet; and magnetic suspension, among others MAGLEV trains or magnetically suspended rotors of very large fans.

The invention further relates to a transport means, for instance a vehicle, a vessel, an aircraft or a train locomotive, comprising at least one drive electric motor with a number of devices according to the invention, which at least one electric motor receives energy via an electronic control unit from at least one rechargeable battery which is connected to solar cells arranged on the transport means, so that during incidence of light on the solar cells these solar cells contribute toward charging of the battery. The use of the invention provides the advantage that the or each electric motor providing for drive of the transport means is substantially more compact and lighter than a prior art electric motor, while its efficiency can also be considerably higher. For instance a car or an aircraft with a light and advanced construction can thus cover a large distance without interruption at a limited speed, for instance during the day at least partially on the basis of sunlight and in the evening and at night on the basis of the charge of the battery. Such transport means therefore have exceptionally great durability.

BRIEF DESCRIPTION OF THE SEVERAL VIEWS OF THE DRAWING(S)

The invention will now be elucidated with reference to the accompanying drawings. In the drawings:

FIG. 12 shows a top view of an elongate plastic substrate embodied as foil on which a number of electrically conductive tracks are arranged, the end zones of which are connected to each other and to two terminals;

FIG. 13 shows a perspective view of a coil obtained by wrapping of the substrate with conductors according to FIG. 12;

FIG. 14 shows a top view of a substrate with two windings which are connected to each other in series;

FIG. 15 shows a structure of substrates with conductors zigzag foldable in concertina manner and thus stackable for the purpose of manufacturing a stack of windings;

FIG. 16 shows an end view of an embodiment of a coil with a through-hole obtained with the structure according to FIG. 15;

DETAILED DESCRIPTION

Figure 1:
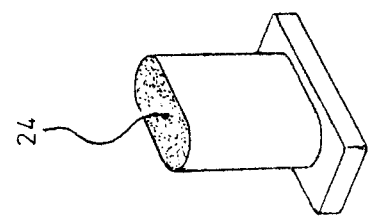
FIG. 1 shows a ferromagnetic core of an electromagnet.

FIG. 1 shows a core 69 as component of an electromagnet 26, 27. The core is for instance embodied as a granular and/or powder-form ferromagnetic material, for instance niobium, iron, ferrite or the like, embedded in polyetherimide.

Figure 2:
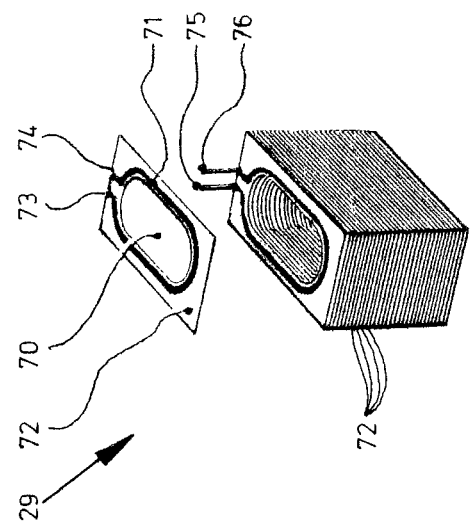
FIG. 2 shows a coil assembled from stacked electrically insulating substrates with electrically conductive tracks for co-action with the ferromagnetic core according to FIG. 1.

FIG. 2 shows a coil 29 comprising a stack of thin printed circuit boards or foils 72, for instance with a thickness in the order of a maximum of 0.1 mm, in which is present a through-hole 70 around which extends a loop-like copper track 71. Printed circuit boards 72 are stacked onto each other in the manner shown in FIG. 2 such that the free terminals 73, 74 of copper track 71 can all come into contact with two electrical conductors 75, 76. Core 69 fits into the through-hole in the stack of printed circuit boards 72. An electromagnet 26, 27 is in this way realized.

Figure 3:
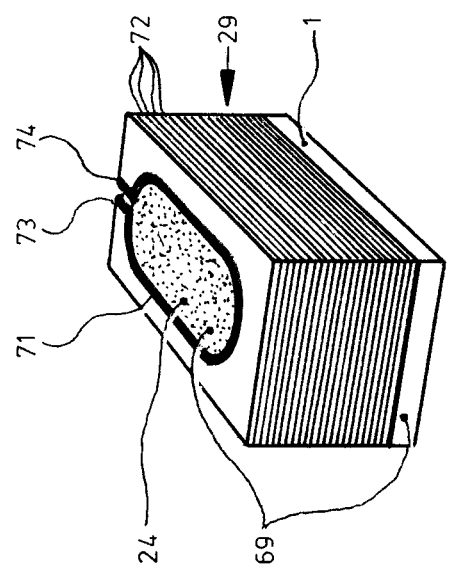
FIG. 3 shows a view corresponding to FIG. 2 of the assembly of the core according to FIG. 1 with the coil according to FIG. 2.

FIG. 3 shows an electromagnet assembled from coil 29 according to FIG. 2 and core 69 according to FIG. 1. Reference numeral 24 designates the upper pole. Reference numeral 1 designates the lower pole which takes a plate-like form.

Figure 4:
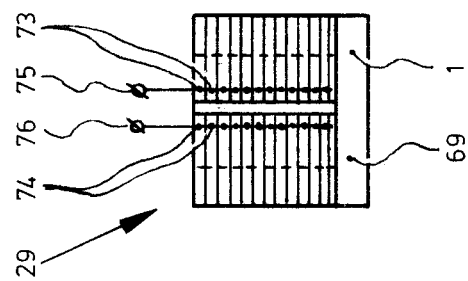
FIG. 4 shows an end view of an embodiment in which the terminals of the conductive tracks are connected in parallel.

FIG. 4 shows that in this embodiment terminals 73, 74 are all connected in parallel and are connected to the respective electrical conductors 75 and 76.

Figure 5:
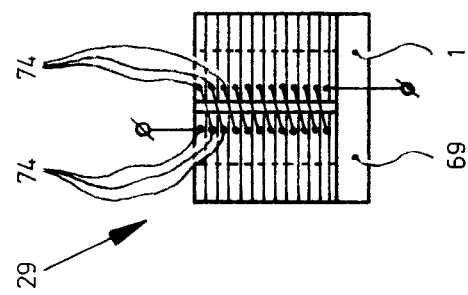
FIG. 5 shows a view corresponding to FIG. 4 of a variant in which the terminals of the tracks are all connected in series.

In the embodiment according to FIG. 5 terminals 73, 74 of the adjacent winding elements are connected alternately to each other, whereby the copper tracks 71 forming the windings are connected to each other in series.

Figure 6:
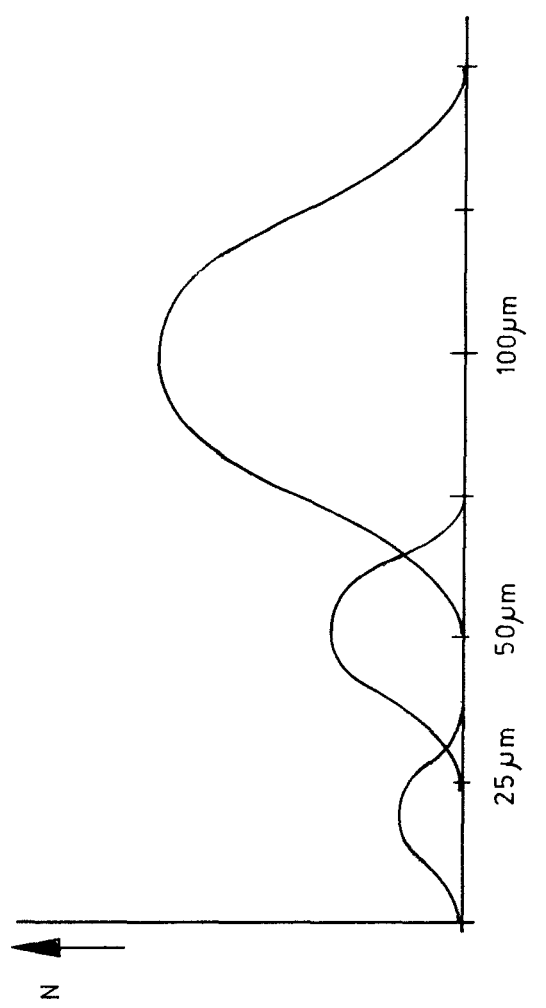
FIG. 6 shows a schematic representation of the statistical grain size distribution when three grain size classes of ferromagnetic grains are used for the assembly of for instance the core according to FIG. 1.

FIG. 6 is a graph showing the relative number of particles in three types of commercially available ferromagnetic powders, the grains of which are spherical. As discussed above, for the purpose of the best possible utilization of the available space in a mould the powders are added, by way of example in the proportions shown in FIG. 6, to polyetherimide absorbed in a solvent and mixed intimately therein. A ferromagnetic dough is hereby obtained which is introduced into a mould of the desired form in order to manufacture for instance a core 69 as according to FIG. 1. In the example according to FIG. 6 three types of powder are used having respectively an average grain size of 100 µm, one of 50 µm in a smaller proportion and one of 25 µm in an even smaller proportion. The main constituent is formed by the portion of the powder with a grain size of an average of 100 µm, while the rest of the grains are distributed statistically in accordance with the shown Gaussian curves. Stacking of the grains of 100 µm type leaves interstitial spaces which are then filled as far as possible by the grains of 50 µm category. The then still remaining interstitial cavities are then further filled, i.e. with the grains in the 25 µm category. Through this mixing an aggregate is obtained with a filling varying little from 100%. Filling ratios of a minimum of 95% can in this way be realized. The ferromagnetic core obtained in this way thus has the properties of the solid ferromagnetic material. However, because it is incorporated as grains in the insulated plastic, the occurrence of eddy currents is precluded.

Figure 7:
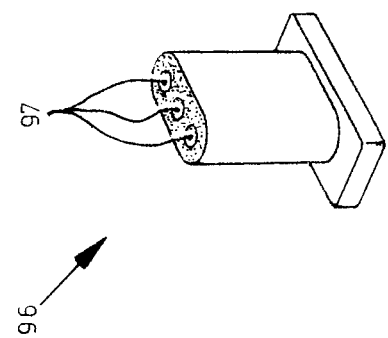
FIG. 7 shows a view corresponding to FIG. 1 of a ferromagnetic core of an electromagnet which comprises through-holes intended for passage of medium for cooling purposes.

FIG. 7 shows a ferromagnetic core 96 with the same general form as core 69 according to FIG. 1. Core 96 differs from core 69 in the presence of continuous channels 97. Cooling medium can be guided through channels 97. The increase in temperature of core 96 during operation can hereby remain limited to a chosen maximum value.

Figure 8:
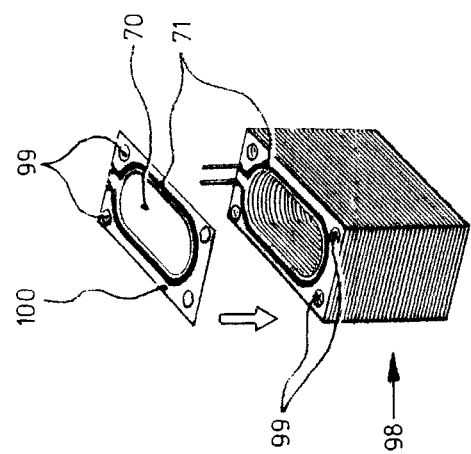
FIG. 8 shows a view corresponding to FIG. 2 of a coil assembled from stacked electrically insulating substrates with electrically conductive tracks and likewise provided with continuous cooling channels.

FIG. 8 shows a coil 98 which, like coil 29 (FIG. 2), comprises a stack of winding elements which each consist of an electrically insulating substrate and a loop-like conductor, for instance of copper, aluminium or other suitable material, present thereon. Situated in the four corner zones of each winding element 100 is a through-hole 99. These holes 99 are registered in coil 98, which comprises a stack of winding elements 100, and thus form four continuous cooling channels through which cooling medium can be guided for the purpose of cooling coil 98.

The conductive loop-like tracks 71 are situated around the registered through-holes 70 into which, as in the embodiment according to FIGS. 1, 2, the ferromagnetic core 96 fits.

Figure 9:
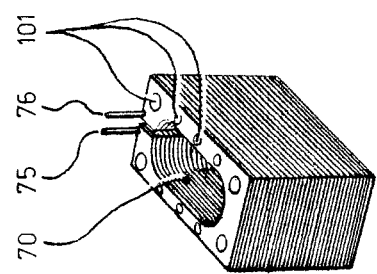
FIG. 9 shows a view corresponding to FIGS. 2 and 8 of a variant in which the conductive tracks extend over the whole of the relevant surfaces of the substrates and the number of cooling channels is increased relative to the embodiment according to FIG. 8.

FIG. 9 shows a coil 102 which differs from coils 29 according to FIGS. 2 and 98 as according to FIG. 8 in the sense that the whole surface on one side of the electrically insulating substrate is provided with an electrically conductive layer, for instance of copper. Extending in this embodiment through both layers are ten cooling channels, all designated 101 here for the sake of convenience. The degree of cooling can hereby be substantially improved. It will be apparent that it is necessary to ensure in both the embodiment according to FIG. 8 and the embodiment according to FIG. 9 that the medium flowing through the cooling channels may only be in thermally conductive contact with the winding elements and that the cooling medium must be electrically separated therefrom. The cooling medium can optionally be guided via tubes through channels 97, which are formed by the registered holes 99, and the channels 101. It is for instance possible to envisage thermally conductive tubes, for instance of copper, provided on their outer side with an electrically insulating coating, for instance of polyetherimide.

Figure 11:
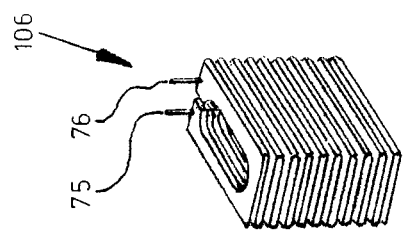
FIG. 11 shows a view corresponding to FIGS. 2, 8 and 9 of an embodiment obtained with the structure according to FIG. 10.
Figure 10:
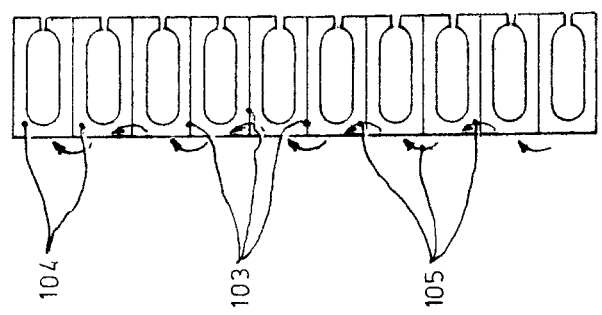
FIG. 10 shows a structure of substrates with conductors zigzag foldable in concertina manner and thus stackable for the purpose of manufacturing a stack of windings.

FIG. 10 shows schematically a strip of winding elements, all designated 7 and mutually connected via hinge zones 103. These elements can be laid on each other pivoting zigzag-wise in the manner indicated schematically with arrows 105. A stack 106 according to FIG. 11 can hereby be formed which corresponds functionally to coil 29 according to FIG. 2.

FIG. 12 shows a strip of foil material 2 on which a number of copper tracks 3 extend. At their end zones these tracks are mutually interconnected and also connected to external terminals 4, 5. The foil material can advantageously be polyetherimide, just as the printed circuit boards or substrates 72 according to FIGS. 2, 3, 4 and 5. Strip 2 need only have a thickness such that its mechanical integrity is ensured during the production process, while it is also necessary to ensure that during winding up of strip 2 to form the coil 6 shown in FIG. 13 the electric voltage between adjacent conductive tracks remains below the breakdown voltage of the polyetherimide foil.

FIG. 14 shows a polyetherimide substrate 7 which, just as substrates 72 according to FIGS. 2, 3, 4 and 5, has a rectangular form. Other than substrates 72, substrate 7 carries two more or less concentrically placed, generally oval or loop-like copper tracks 8, 9, and tracks 8, 9 are connected in series between terminals 11, 12 by means of an external interconnection 10.

FIG. 15 shows schematically a strip of winding elements, all designated 7 and mutually connected via hinge zones 103. These elements 7 can be laid on each other pivoting zigzag-wise in the manner indicated schematically with arrows 105. A stack 13 of substrates 7 according to FIG. 16 can hereby be formed. A coil is then hereby realized wherein each coil element 7, 8, 9 comprises two windings.

Figure 18:
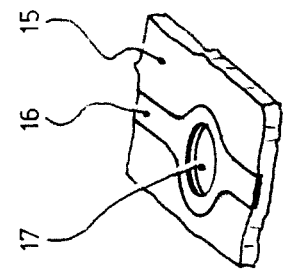
FIG. 18 shows the detail XVIII on larger scale.
Figure 17:
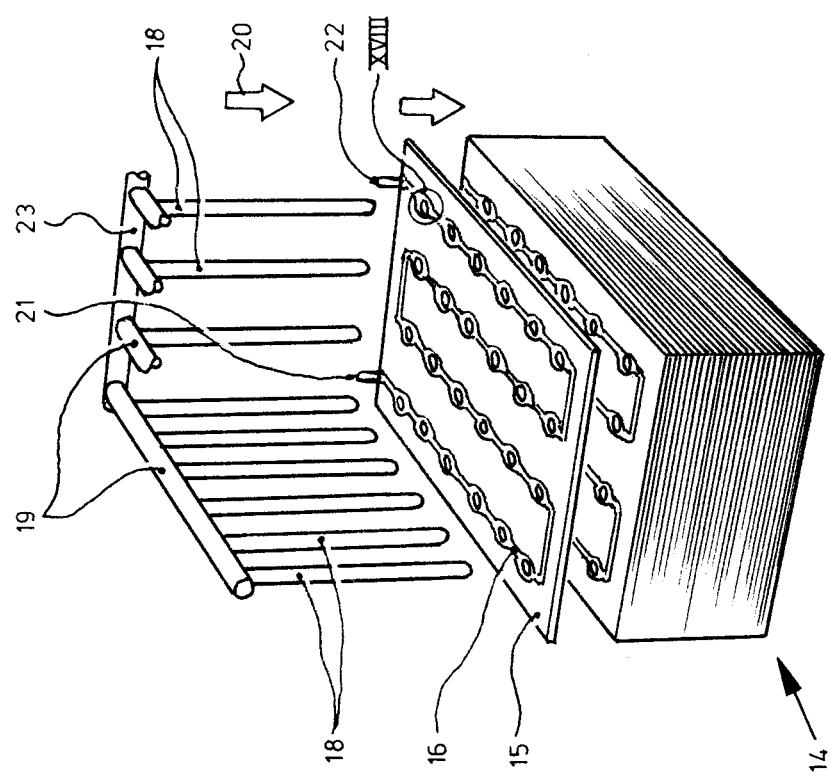
FIG. 17 shows a stack of foil-like substrates on which tracks of resistance material are present which are provided with perforations, in addition to a heat pipe construction for discharging the heat from the tracks of resistance material.

FIG. 17 shows a stack 14 of rectangular polyimide substrates 15 with tracks 16 of resistance material extending in zigzag manner. The tracks are widened locally and provided at the position of each widening with a through-hole 17 which is clearly shown particularly in FIG. 18. All substrates 15 with tracks 16 and holes 17 are given an identical form and placed in register with each other such that channels (not shown) extend through stack 14. Tubes 18, which are closed on the underside, of a grid-like arrangement with manifolds 18 are inserted as according to an arrow 20 into these channels. Tubes 18 fit tightly into holes 17 and have on their surface a very thin coating of polyetherimide. Tubes 18, which take a very thin-walled form and consist of copper, are hereby only in thermal contact with the tracks of resistance material 16 and are electrically insulated therefrom. During passage of electric current via terminals 21, 22 through the tracks 16 connected in parallel the tracks 16 are heated, and tubes 18 are hereby heated. Tubes 18 are filled with a two-phase medium consisting partially of liquid and partially of vapour. Tubes 18 thus operate as heat pipes. These are able to transport heat with a very high coefficient of thermal conduction to the central manifold 23 which transports the heat, in a manner which is per se known and therefore not drawn and elucidated, to a location where it has to be used.

Attention is duly drawn to the fact that all through-holes in the stacks of substrates according to FIGS. 2, 3, 4, 5, 8, 14, 15, 16 are exactly in register with each other, whereby a core, a heat discharge element or the like can be inserted into the thus continuous holes or channels.

Figure 20:
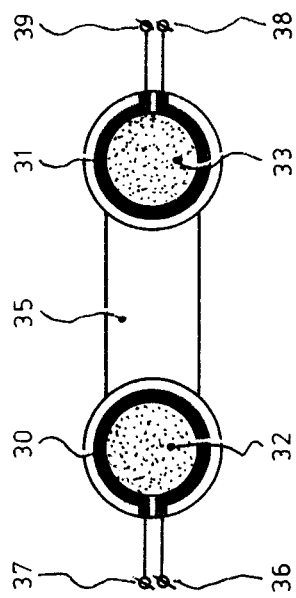
FIG. 20 shows the cross-section XX-XX according to FIG. 19.
Figure 19:
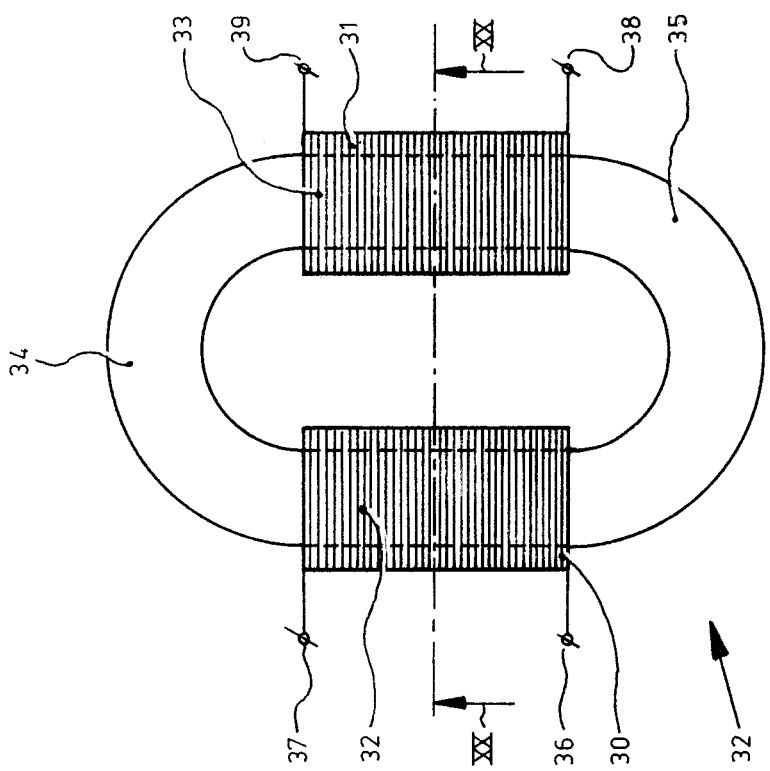
FIG. 19 shows a schematic view of a transformer with a largely oval-shaped magnetic circuit and two coils.

FIG. 19 shows a transformer 32 with a primary coil 30 and a secondary coil 31, which coils are of the type according to FIG. 2, FIG. 8, a type with coils consisting of winding elements as according to FIG. 14, or the like, wherein as in all shown exemplary embodiments the through-hole is prismatic, i.e. has the same cross-section throughout. In this embodiment the hole is round as shown in FIG. 20. A ferromagnetic core 32 extends in the prismatic holes of primary coil 30 and secondary coil 31 and a ferromagnetic core 33 extends in the through-hole of secondary coil 31. Outside the area of windings 30, 31 the cores are mutually interconnected by means of two semi-toroidal bridges 34, 35, likewise of ferromagnetic material, which for instance form part of two respective ferromagnetic units comprising both a part of the cores and a bridge.

Cores 32, 33 and bridges 34, 35 consist of ferromagnetic material of the type described above, i.e. on the basis of an aggregate of three types of ferromagnetic powders of differing grain sizes embedded in plastic.

The terminals of coils 30, 31 are designated respectively 36, 37 and 38, 39.

Figure 22:
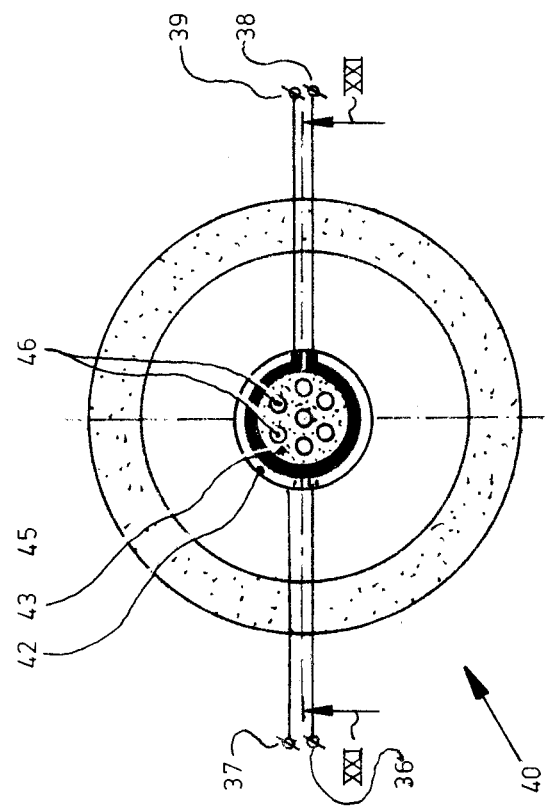
FIG. 22 shows the section XXII-XXII according to FIG. 21.
Figure 21:
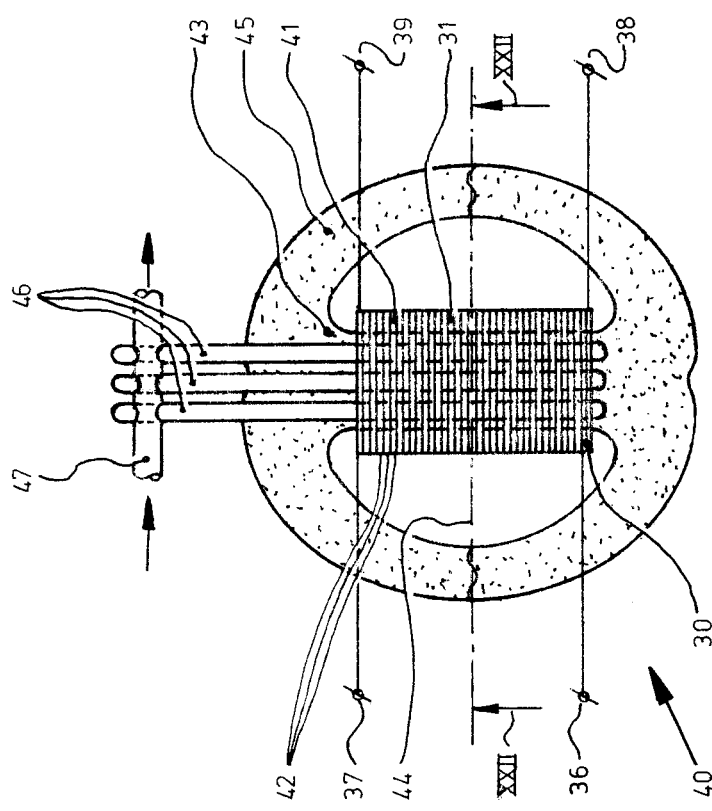
FIG. 21 shows the cross-section XXI-XXI according to FIG. 22 of a more less apple-shaped transformer according to the invention with a heat pipe system for discharging heat.

FIGS. 21 and 22 show a highly advanced transformer 40 with a primary coil 30 and a secondary coil 31 which in this embodiment form part of one stack 41 of substrates 42.

The prismatic core 43 with bridge 45 is embodied divided into two parts. During assembly of the transformer the first part of core 43 with the part of bridge 45 forming a whole therewith is first inserted into the continuous prismatic channel in stack 41, and the remaining part of core 43 with the second part of bridge 45 connecting tightly thereto is then connected.

As shown clearly in FIGS. 21 and 22, bridge 45 is rotation-symmetrical and the transformer 40 has a generally spherical shape.

As will however be apparent from FIG. 21, transformer 40 does not have an ideal spherical shape externally. It is to some extent elongate, while having slight recesses at the poles. There is a technical reason for this shape. In this advanced transformer 40 the overall effective cross-sectional area of bridge 45 through which the magnetic flux flows is substantially equal at each angular position +/−90° relative to the equator plane 44 to the cross-sectional area of core 43, whereby the magnetic flux density is substantially equal in each said cross-sectional area.

This structure achieves that the magnetic saturation, should this already be reached, is reached substantially simultaneously at each location. Transformer 40 thereby has the greatest possible magnetic efficiency with a minimum quantity of ferromagnetic material.

During use of the transformer, and certainly when it is loaded close to its limit, it is not possible to avoid some heating taking place. In this respect seven heat pipes 46, which are connected to a manifold 47, extend through the upper pole of bridge 45.

Figure 23:
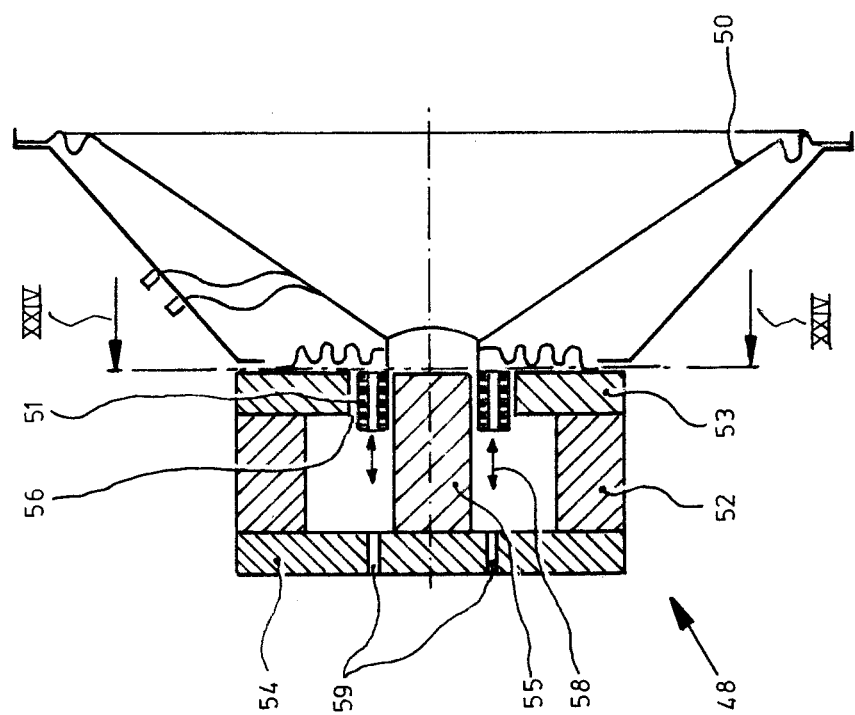
FIG. 23 shows a cross-section through a loudspeaker according to the invention.

FIG. 23 shows a cross-section through an electrodynamic loudspeaker 48 according to the invention. The loudspeaker comprises a frame 49, a cone 50 suspended in elastically reciprocating manner relative to said frame 49, a voice coil unit 51 which is coupled to cone 50 and which comprises a coil which corresponds functionally to coil 98 according to FIG. 8, and a magnet unit with an annual permanent magnet 52, and a ferromagnetic yoke 53, 54, 55 which defines a cylindrical gap 56 in which a magnetic field prevails under the influence of permanent magnet 52 and in which the voice coil unit 51 is movable reciprocally in axial direction under the influence of the electric alternating currents carried by the coil of the voice coil unit. All yoke parts 53, 54, 55 are embodied in grains of ferromagnetic material embedded in polyetherimide.

Voice coil unit 51 comprises a stack of elements, for instance similar to stack 98 according to FIG. 8, which stack comprises a collar of, in this embodiment, twelve continuous channels 57 for passage of a reciprocating airflow 58 during operation of loudspeaker 48. This airflow has a cooling effect on voice coil unit 51. The ferromagnetic yoke plate 54 likewise has a collar of continuous cooling channels 59 for passage of a reciprocating airflow during operation of loudspeaker 48.

Figure 24:
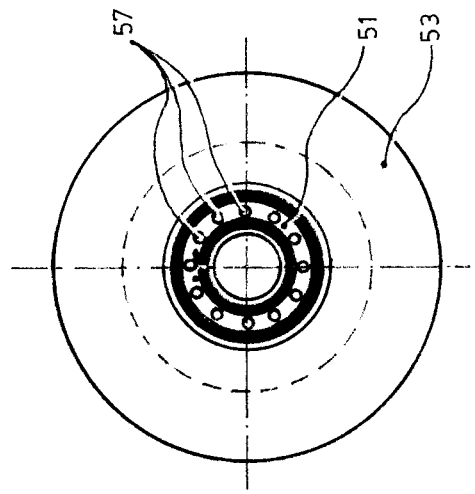
FIG. 24 shows the view XXIV-XXIV according to FIG. 23 of the motor system of the loudspeaker according to FIG. 23.

FIG. 24 shows yoke plate 53 and voice coil unit 5 with cooling channels 57.

Figure 25:
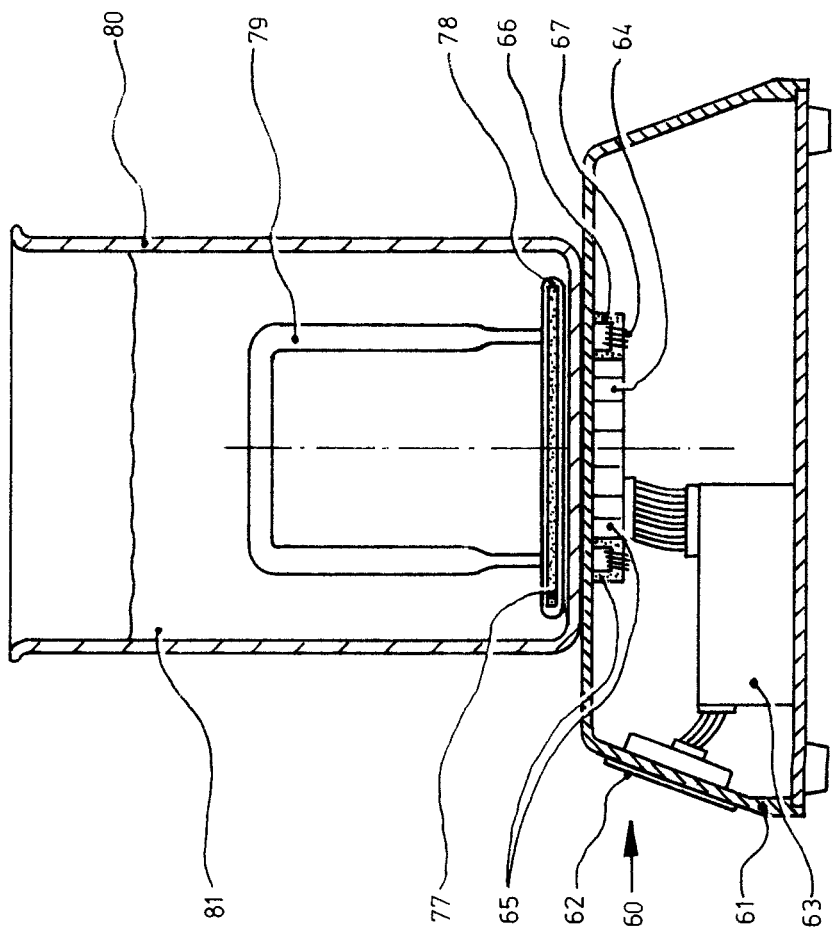
FIG. 25 shows a cross-section through a stirring device in a first embodiment.

FIG. 25 shows a stirring device 60. This comprises a support frame 61 carrying an operating unit 62. Connected to operating unit 60 is a central control unit 63 which controls an annular electromagnetic unit 64. This unit 64 comprises a number of electromagnets 65 which are disposed in a collar formation and which all comprise a generally U-shaped core 66 and a coil 67 co-acting therewith. The core is of the type discussed above and is manufactured on the basis of ferromagnetic spherical grains embedded in polyetherimide. Coil 67 is of the above described type according to the invention comprising a stack of substrates with one or more windings thereon. With appropriate control by control unit 63 a rotating magnetic field is generated by electromagnets 65. An elongate ferromagnetic element 77, likewise on the basis of the magnet material according to the invention embedded in a disc 78 of inert material, is hereby set into rotation. Stirring bracket 79 is connected to the disc.

The stirring gear consists of disc 78 with stirring bracket 79. In the presence of the rotating magnetic field the elongate ferromagnetic element 77, and thereby disc 78, will follow this rotation and the stirring bracket is driven in rotation. Stirring gear 77, 78, 79 is situated in a holder 80 in which the substance 81 for stirring is situated. The holder can in principle be of any size.

Figure 26:
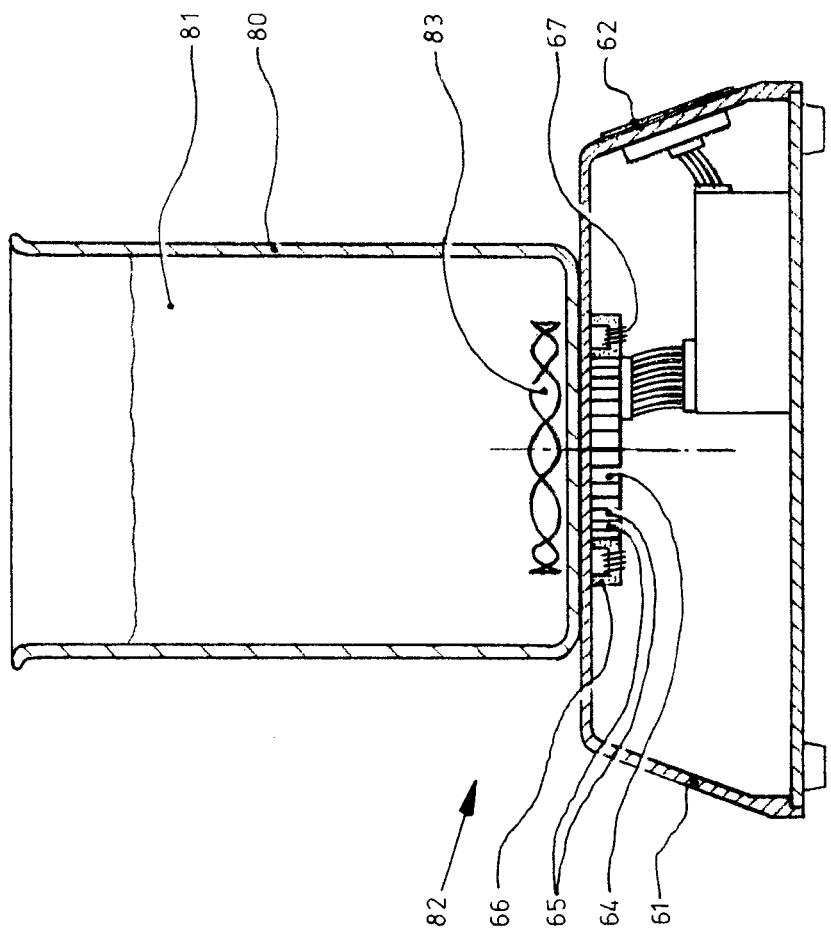
FIG. 26 shows a cross-section corresponding to FIG. 25 through a stirring device in a second exemplary embodiment.

FIG. 26 shows a stirring device 82 which differs from stirring device 60 according to FIG. 25 in the sense that the electromagnets 65 are smaller and connect at a smaller angular distance to each other.

In this embodiment the stirring gear comprises only a twisted ferromagnetic ribbon 83 modelled in the shape of a ring. The diameter of the ring and the diameter of the collar of electromagnets are roughly equal. The wavelength of the twisted ribbon in this embodiment is about 4 to 5 times greater than the pitch distance of electromagnets 65. The electronic control unit 63 conducts currents through electromagnets 65 during operation such that all lowest zones 84 of ribbon 83 which lie closest to electromagnets 65 all co-act magnetically with electromagnets 65. In the present embodiment the ribbon comprises twelve wavelengths. With a 48-pole stator, i.e. the collar of electromagnets 65, a powerful rotating magnetic field can thus be generated, whereby the ferromagnetic ribbon is rotated effectively and with force through driving via all twelve lowest zones.

Figure 27:
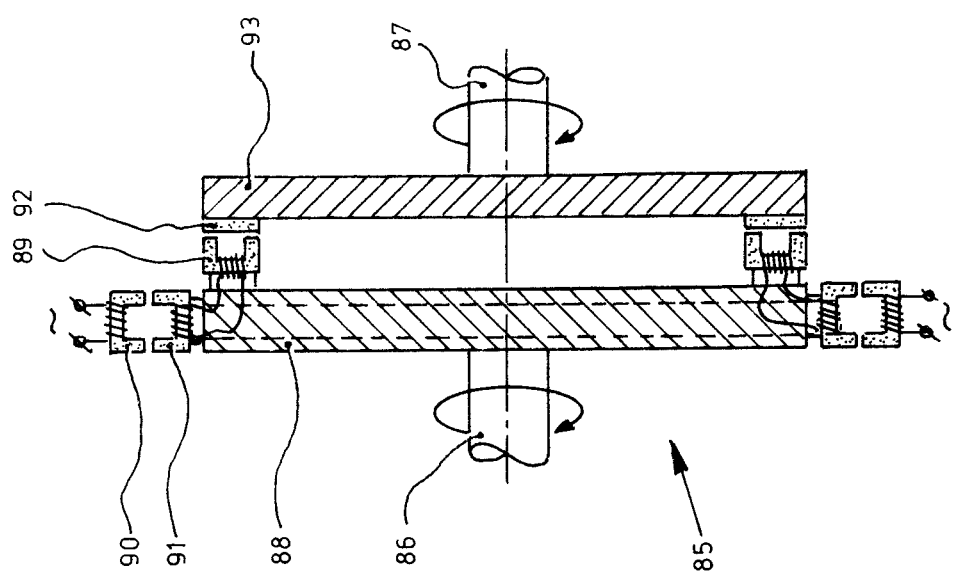
FIG. 27 shows a cross-section through an adjustable electromagnetic clutch according to the invention in a first embodiment.

FIG. 27 shows an adjustable clutch 85 between two shafts 86, 87 which are disposed axially aligned to each other for rotation relative to a frame (not shown).

The clutch comprises a first clutch disc supported by shaft 86 and having on the free end surface thereof an annular collar of electromagnets 89 according to the invention carried and the secondary section of a rotary transformer, the primary section of which is disposed fixedly relative to the frame, which secondary section is connected to electromagnets 89 for actuation thereof.

The primary section of the rotary transformer comprises an annular collar of electromagnets 90 which are connected to the second clutch disc 93 supported by second shaft 87. In the case where electromagnets 89 are thus actuated, clutch discs 88 and 93, and thereby shafts 86 and 87, are forced to rotate together. When actuation of electromagnets 89 is terminated, this clutch is released and shafts 86 and 87 can rotate independently of each other.

In an alternative embodiment the cores of electromagnets 89 are embodied as powerful permanent magnets, for instance of neodymium. The coils of these electromagnets 89 are connected via rectifiers (not shown) to the secondary electromagnets of rotary transformer 90, 91. The amperage and the strength of the permanent magnets is selected such that, when electromagnets 89 are not actuated, these electromagnets co-act with ferromagnetic elements 92 and the shafts are forced to rotate together and, when electromagnets 89 are actuated by the external source of alternating current, the magnetization of the cores of electromagnets 89 are reduced to a value of substantially zero and the magnetic co-action between electromagnets 89 and ferromagnetic elements 92 is disabled, whereby the shafts can rotate independently of each other.

The number of active electromagnets 89 can be set under the control of an electronic unit, this such that, individually or in groups, the active magnets are distributed angularly equidistant over the collar. The clutch according to FIG. 27 can thus operate as transmission with adjustable transmission ratio.

Figure 28:
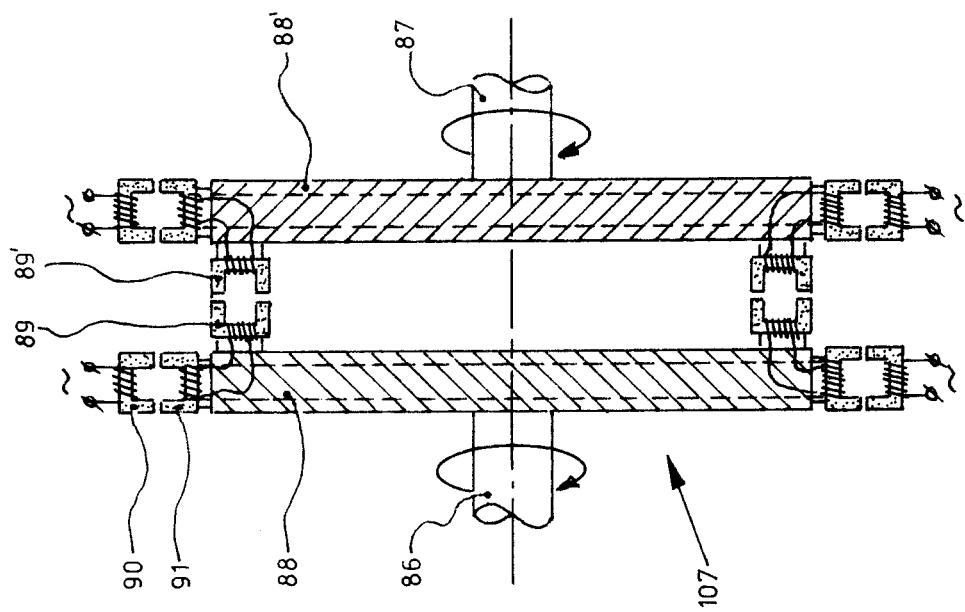
FIG. 28 shows a cross-section corresponding to FIG. 27 through an adjustable clutch in a second embodiment.

FIG. 28 shows an embodiment in which clutch 107 is constructed wholly symmetrically from two identical discs 88, 88'. Such an embodiment provides a greater degree of freedom of electronic control.

The invention claimed is:

1. An electrical device comprising a stack of electric elements, each comprising:
   an electrically insulating substrate and at least one electrically conductive track connected to said substrate;
   the end zones of each of which tracks have terminals either for connection to a source of electrical energy, whereby electric current is conducted through each track during operation, or connection to a device for taking off electric current generated by magnetic induction in the track;

which electric elements are connected mechanically to each other such that the device is unitary;

wherein:

the terminals of each of the at least one electrically conductive track are arranged to be connected selectively in parallel or in series by an external switching device;

the device comprises a coil assembled from winding having electrically the same orientation, and the tracks comprise electrically conductive material and each winding extends in loop-form between two end zones; wherein each element has a registered and uniform through-hole present inside the or each loop, these registered and uniform through-holes forming a channel in which a fixed or longitudinally movable ferromagnetic core is present which co-acts with the windings;

the core comprises grains of ferromagnetic material embedded in a plastic; and the grains are substantially spherical and a number of classes of grains of different grain size are premixed in accordance with a Gaussian distribution during production in a manner such that the interstitial spaces between relatively large grains are filled for a major part with relatively small grains such that the available space is occupied to a minimum of 90% by grains of ferromagnetic material.

2. The device as claimed in claim 1, wherein each substrate consists of a thermoplastic and the electrical elements are adhered to each other by welding the substrates of mutually adjacent electrical elements to each other by fusion through temperature increase to the softening temperature of the plastic.

3. The device as claimed in claim 1, wherein each substrate consists of a thermoplastic and the electrical elements are adhered to each other by evaporating solvent in which the plastic was present prior to the manufacture of the device by increasing temperature.

4. The device as claimed in claim 1, wherein the core forms part of a closed ferromagnetic circuit, wherein the end zones of the core outside the area of the coil are connected to each other by a ferromagnetic bridge.

5. The device as claimed in claim 4, wherein the core with the bridge is embodied divided into at least two parts, and during assembly of the device the whole core or at least the first part of the core with the part of the bridge connected thereto or forming a whole therewith is first inserted into the channel and the remaining part of the bridge with optionally the second part of the core is then connected tightly thereto.

6. An electric motor, comprising:

an electrical device comprising a stack of electric elements, each comprising:

an electrically insulating substrate and at least one electrically conductive track connected to said substrate;

the end zones of each of which tracks have terminals either for connection to a source of electrical energy, whereby electric current is conducted through each track during operation, or connection to a device for taking off electric current generated by magnetic induction in the track;

which electric elements are connected mechanically to each other such that the device is unitary;

wherein:

the terminals of each of the at least one electrically conductive track are arranged to be connected selectively in parallel or in series by an external switching device;

the device comprises a coil assembled from winding having electrically the same orientation, and the tracks comprise electrically conductive material and each winding extends in loop-form between two end zones; and each element has a registered and uniform through-hole present inside the or each loop, these registered and uniform through-holes forming a channel in which a fixed or longitudinally movable ferromagnetic core is present which co-acts with the windings;

a stator with an annular collar of electromagnets;

an electronic power supply and control unit for conducting electric currents through the electromagnets such that they together effectively generate a rotating magnetic field; and a rotor with at least one ferromagnetic element which co-acts magnetically with the magnetic fields generated by the electromagnets; such that the rotor is driven rotatingly by the rotating magnetic field, wherein under the control of the power supply and control unit the starting torque of the rotor is temporarily increased during starting thereof by temporarily connecting in parallel the coils of two or more adjacent devices.

7. The electric motor as claimed in claim 6 operatively associated with one of a rotary actuator, a motor, a clutch between two axially aligned rotatable shafts, an adjustable transmission, a stirring device.

8. An adjustable clutch between two shafts which are disposed axially aligned for rotation relative to a frame, the clutch comprising:

a first clutch disc carried by the one shaft with:

an annular collar of electromagnets comprising a stack of electric elements, each comprising:

an electrically insulating substrate and at least one electrically conductive track connected to said substrate;

the end zones of each of which tracks have terminals either for connection to a source of electrical energy, whereby electric current is conducted through each track during operation, or connection to a device for taking off electric current generated by magnetic induction in the track;

which electric elements are connected mechanically to each other such that the device is unitary;

wherein:

the terminals of each of the at least one electrically conductive track are arranged to be connected selectively in parallel or in series by an external switching device;

the device comprises a coil assembled from winding having electrically the same orientation, and the tracks comprise electrically conductive material and each winding extends in loop-form between two end zones; and each element has a registered and uniform through-hole present inside the or each loop, these registered and uniform through-holes forming a channel in which a fixed or longitudinally movable ferromagnetic core is present which co-acts with the windings;

a stator with an annular collar of electromagnets;

an electronic power supply and control unit for conducting electric currents through the electromagnets such that they together effectively generate a rotating magnetic field;

a rotor with at least one ferromagnetic element which co-acts magnetically with the magnetic fields generated by the electromagnets; such that the rotor is driven rotatingly by the rotating magnetic field;

the electromagnets being carried on the free end surface of the clutch disc; and a secondary section of a rotary transformer, a primary section of which is disposed fixedly relative to the frame, which secondary section is connected to the electromagnets for actuation thereof; and a second clutch disc which is carried by the other shaft and the free end surface of which carries a number of ferromagnetic elements corresponding to the number of electromagnets of the first clutch disc for magnetic co-action with said electromagnets when these are actuated via the rotary transformer by an adjustable, at least on and off switchable, external source of alternating current.

9. The clutch as claimed in claim 8, wherein:

cores of the electromagnets are embodied as permanent magnets;

coils of the electromagnets are connected via rectifier means to the secondary section of the rotary transformer;

such that:

when the electromagnets are not actuated, these electromagnets co-act with the ferromagnetic elements and the shafts are forced to rotate together; and when the electromagnets are actuated by the external source of alternating current the magnetization of the cores is reduced to a value of at least approximately zero and the magnetic coaction between the electromagnets and the ferromagnetic elements is disabled and the shafts can rotate independently of each other.

10. The clutch as claimed in claim 8, wherein the number of active electromagnets can be adjusted under the control of the electronic unit in a manner such that the active electromagnets are distributed individually or in groups angularly equidistant over the collar such that the clutch also operates as transmission with adjustable transmission ratio.

* * * * *